(12) United States Patent
Li et al.

(10) Patent No.: US 9,444,291 B2
(45) Date of Patent: Sep. 13, 2016

(54) ELECTROMAGNETIC DRIVE MECHANISM

(71) Applicant: Johnson Electric S.A., Murten (CH)

(72) Inventors: Yue Li, Hong Kong (CN); Jinyun Gan, Hong Kong (CN); Chuiyou Zhou, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 287 days.

(21) Appl. No.: 14/075,693

(22) Filed: Nov. 8, 2013

(65) Prior Publication Data

US 2014/0125152 A1   May 8, 2014

(30) Foreign Application Priority Data

Nov. 8, 2012  (CN) .......................... 2012 1 0444255

(51) Int. Cl.
  *H02K 1/08*  (2006.01)
  *H02K 1/06*  (2006.01)
  *H02K 26/00*  (2006.01)

(52) U.S. Cl.
  CPC ........ *H02K 1/08* (2013.01); *H02K 1/06* (2013.01); *H02K 26/00* (2013.01); *H02K 2201/03* (2013.01)

(58) Field of Classification Search
  CPC ...... H02K 1/06; H02K 1/08; H02K 2201/03; H02K 26/00
  USPC ............ 310/29, 97, 98, 75 R, 49.42, 156.32, 310/266, 268, 267, 36, 37; 335/272, 228
  See application file for complete search history.

(56) References Cited

U.S. PATENT DOCUMENTS

| | | | | | |
|---|---|---|---|---|---|
| 2,063,340 | A | * | 12/1936 | Ruben .................... | H02K 25/00 310/46 |
| 3,366,905 | A | * | 1/1968 | Kane, Jr ................ | H02K 24/00 310/46 |
| 3,435,394 | A | * | 3/1969 | Egger ..................... | H01F 7/145 335/125 |
| 3,750,065 | A | * | 7/1973 | Myers .................... | H01F 7/145 335/272 |
| 3,753,180 | A | * | 8/1973 | Sommer ................. | H01F 7/145 310/46 |
| 4,006,375 | A | * | 2/1977 | Lyman, Jr. ............. | H02K 37/08 310/268 |
| 4,629,916 | A | * | 12/1986 | Oudet ..................... | H02K 7/20 310/156.35 |
| 4,843,268 | A | * | 6/1989 | Hovorka ................ | H02K 29/08 310/112 |
| 5,703,555 | A | * | 12/1997 | McCann ................ | H02K 26/00 310/40 R |
| 5,845,390 | A | * | 12/1998 | Cheng .................... | H02K 3/525 29/596 |
| 6,043,579 | A | * | 3/2000 | Hill ........................ | H02K 21/24 310/114 |
| 2005/0236914 | A1 | * | 10/2005 | Horiike ................. | H02K 1/145 310/49.07 |
| 2013/0026874 | A1 | * | 1/2013 | Kondou .................. | H02K 1/16 310/195 |
| 2013/0342296 | A1 | * | 12/2013 | Li .......................... | H02K 26/00 335/220 |

FOREIGN PATENT DOCUMENTS

WO  WO 2011121983  * 10/2011

* cited by examiner

*Primary Examiner* — Terrance Kenerly
*Assistant Examiner* — Ahmed Elnakib
(74) *Attorney, Agent, or Firm* — Muncy, Geissler, Olds & Lowe, P.C.

(57) ABSTRACT

An electromagnetic drive mechanism (10) comprises a rotor (50) configured to rotate within a stator (30). The rotor (50) and stator (30) have multiple poles (56, 36), wherein each pole comprises a radial inner portion (564, 362) and a radial outer portion (562, 364). The radial inner portions (564, 362) and radial outer portions (562, 364) of the rotor (50) and stator (30) have different heights, forming a step (566, 366) between the radial inner and outer portions of the rotor (50) and stator (30). This configuration allows for overlapping radial surfaces in addition to overlapping axial surfaces during operation of the drive mechanism (10), thereby increasing the total overlap area and thus the reluctance torque, and potentially improving response speed while allowing for a more compact device (10).

18 Claims, 8 Drawing Sheets

ELECTROMAGNETIC DRIVE MECHANISM

CROSS REFERENCE TO RELATED APPLICATION(S)

This application claims the benefit of Chinese patent application serial no. 201210444255.8, which was filed on Nov. 8, 2012. The entire content of the aforementioned patent application is hereby incorporated by reference for all purposes.

BACKGROUND

Electromagnetic drive mechanisms are suitable for a variety of short stroke, fast response applications. For example, a drive mechanism may be used to drive a bypass passage door for a high speed sorting device.

FIG. 1 illustrates an example of a conventional electromagnetic drive mechanism 1. Drive mechanism 1 may comprise a stator 2 and a rotor 3 that rotates relative to stator 2. Rotor 3 may comprise an output shaft 4 comprised of a non-magnetic material, and a rotor core 5 comprising a magnetic material and fixed to the output shaft 4. The rotor core 5 may comprise a plurality of rotor poles 6 of substantially uniform thickness.

The stator 2 may comprise a plurality of upper and lower stator core portions 7 comprised of a magnetic material and arranged along the axis of the rotor shaft 4, as well as winding groups 8 wrapped around the outside of stator core portions 7. The upper and lower stator core portions 7 comprise a plurality of stator pole 9. There may be a gap between rotor poles 6 and stator poles 9, allowing the rotor 3 to rotate relative to the stator 2.

While historically, performance, life cycle capability, heat transfer, hysteresis and curve profile have been the primary considerations when designing drive mechanisms, as systems and application evolve, other characteristics such as speed, responsiveness, and device size have increased in importance.

Thus, there exists a need for an improved compact, fast-response drive mechanism.

SUMMARY

Embodiments are directed at a compact, fast response electromagnetic drive mechanism. In some embodiments, the drive mechanism comprises a rotor configured to rotate within a stator. The rotor and stator may have a plurality of poles, wherein each pole comprises a radial inner portion and a radial outer portion. The radial inner portions and radial outer portions of the rotor and stator poles may be configured to be of different thicknesses. For example, the radial inner portion of a rotor pole may be configured to have a greater thickness in the axial direction than the radial outer portion, while the radial inner portion of a stator pole may be configured to have a smaller thickness in the axial direction than the radial outer portion. The differing thicknesses of the radial inner and outer portions of a pole form a step between the radial inner and outer portions of the pole. This configuration may allow for overlapping radial surfaces in addition to axial surfaces during operation of the drive mechanism, increasing the total overlap area and thus the amount of reluctance torque generated by the drive mechanism, potentially improving response speed while allowing for a more compact device.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Figure 1:
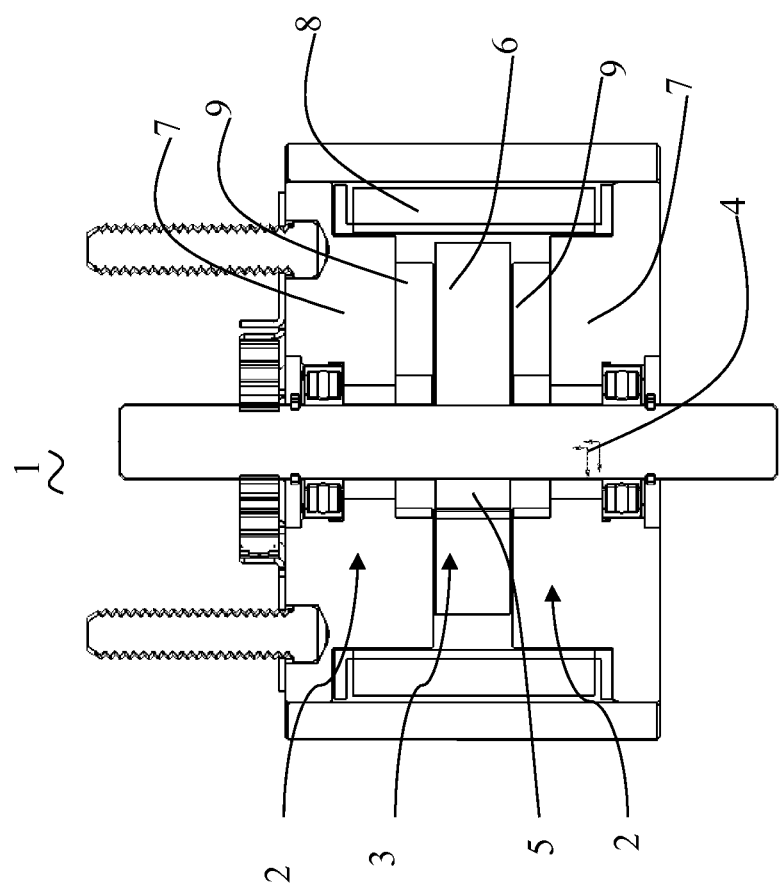
FIG. 1 illustrates an example electromagnetic drive mechanism.

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Embodiments are directed at a compact, fast-response electromagnetic drive mechanism. In some embodiments, the drive mechanism comprises a rotor configured to rotate within a stator. The rotor and stator may have a plurality of poles, wherein each pole comprises a radial inner portion and a radial outer portion.

The radial inner portions and radial outer portions of the rotor and stator poles may be configured to be of different thicknesses. For example, the radial inner portion of a rotor pole may be configured to have a greater thickness in the axial direction than the radial outer portion, while the radial inner portion of a stator pole may be configured to have a smaller thickness in the axial direction than the radial outer portion. The differing thicknesses of the radial inner and outer portions of a pole form a step between the radial inner and outer portions of the pole. This configuration may allow for overlapping radial surfaces in addition to axial surfaces during operation of the drive mechanism, increasing the amount of reluctance torque generated by the drive mechanism, potentially improving response speed while allowing for a more compact device.

Figure 2:
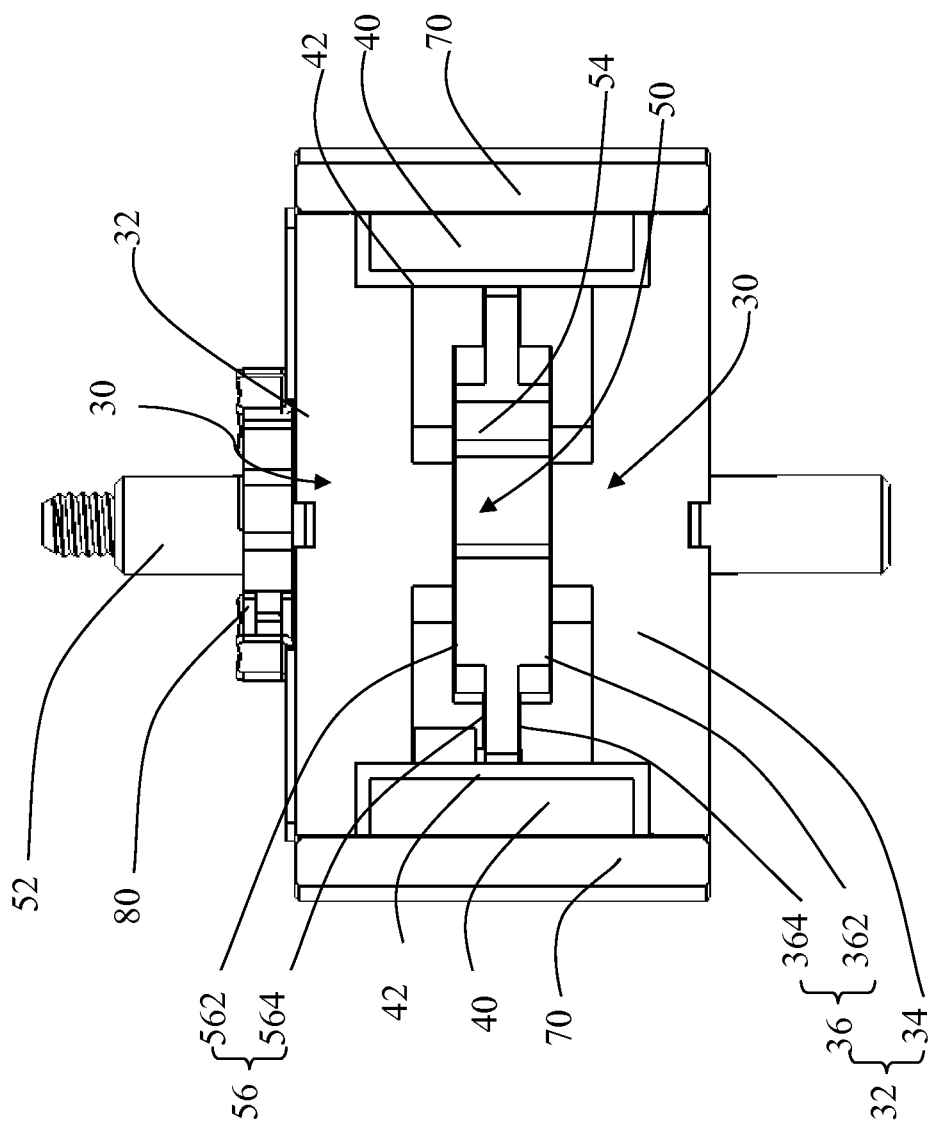
FIG. 2 illustrates a cross-sectional side view of an electromagnetic drive mechanism in accordance with some embodiments.

FIG. 2 illustrates a cross-sectional side view of an electromagnetic drive mechanism 10 in accordance with some embodiments, which comprises a stator 30 and a rotor 50 configured to rotate relative to stator 30. In some embodiments, stator 30 comprises a stator core 32 made of a paramagnetic material (e.g., steel) and a plurality of winding groups 40 wound around stator core 32.

Figure 3:
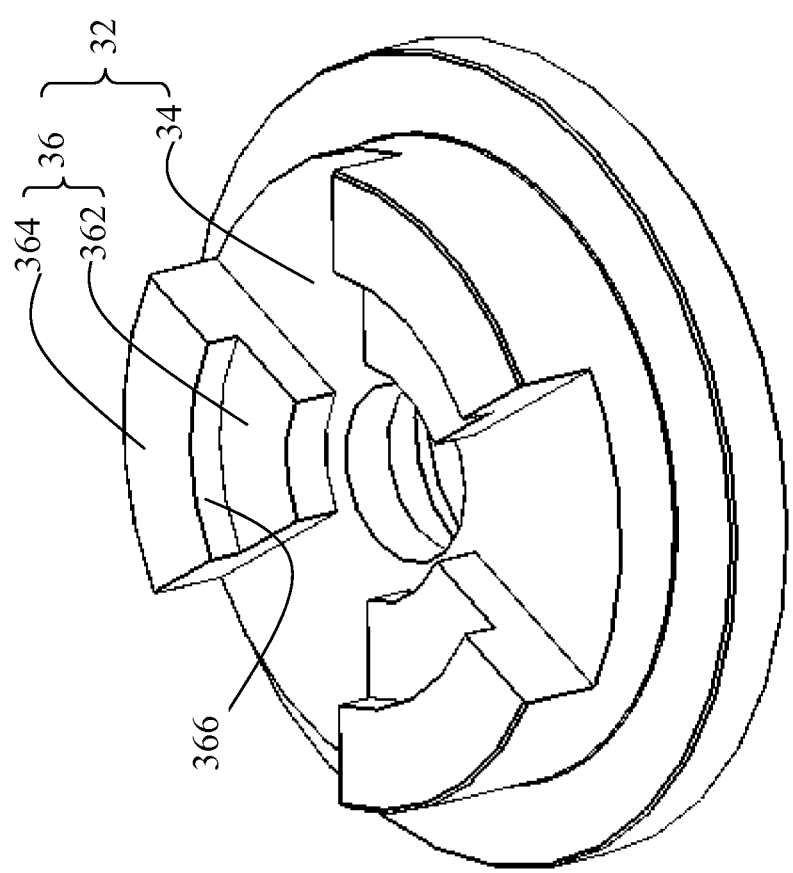
FIG. 3 illustrates a lower portion of a stator core used in an electromagnetic drive mechanism in accordance with some embodiments.

FIG. 3 illustrates a portion of stator core 32 in accordance with some embodiments. Stator core 32 may comprise a base 34 and a plurality of stator poles 36 extending from base 34 in an axial direction. Stator base 34 may be configured to have a substantially circular face perpendicular to an axial direction of rotor 50. It shall be noted that the term "substantially" or "substantial" such as the "substantially circular" is used herein to indicate that certain features, although designed or intended to be perfect (e.g., perfectly circular), the fabrication or manufacturing tolerances, the slacks in various mating components or assemblies due to design tolerances or normal wear and tear, or any combinations thereof may nonetheless cause some deviations from this designed, perfect characteristic. Therefore, one of ordinary skill in the art will clearly understand that the term "substantially" or "substantial" is used here to incorporate at least such fabrication and manufacturing tolerances, the slacks in various mating components or assemblies, or any combinations thereof.

Stator poles 36 may comprise a radial inner portion 362 and a radial outer portion 364. Radial inner portion 362 and radial outer portion 364 are configured to have different heights in the axial direction, forming a step 366 there between. For example, in the illustrated embodiments, radial outer portion 364 is configured to have a greater height than radial inner portion 362. In the embodiment illustrated in FIG. 3, stator core 32 comprises three stator poles 36 spaced in circumferentially equal intervals around a central axis of base 32. It is understood that different numbers of stator poles may be used in other embodiments, such as four, five, or six stator poles.

In some embodiments, winding groups 40 are wound around the outside of the stator poles 36, and may be configured so that the center of the winding groups 40 is coaxial with the axis of the rotor 50. In some embodiments, an insulating winding frame or sleeve 42 may be placed over stator core 32, wherein the winding groups 40 are wound around the winding frame 42.

Figure 4A:
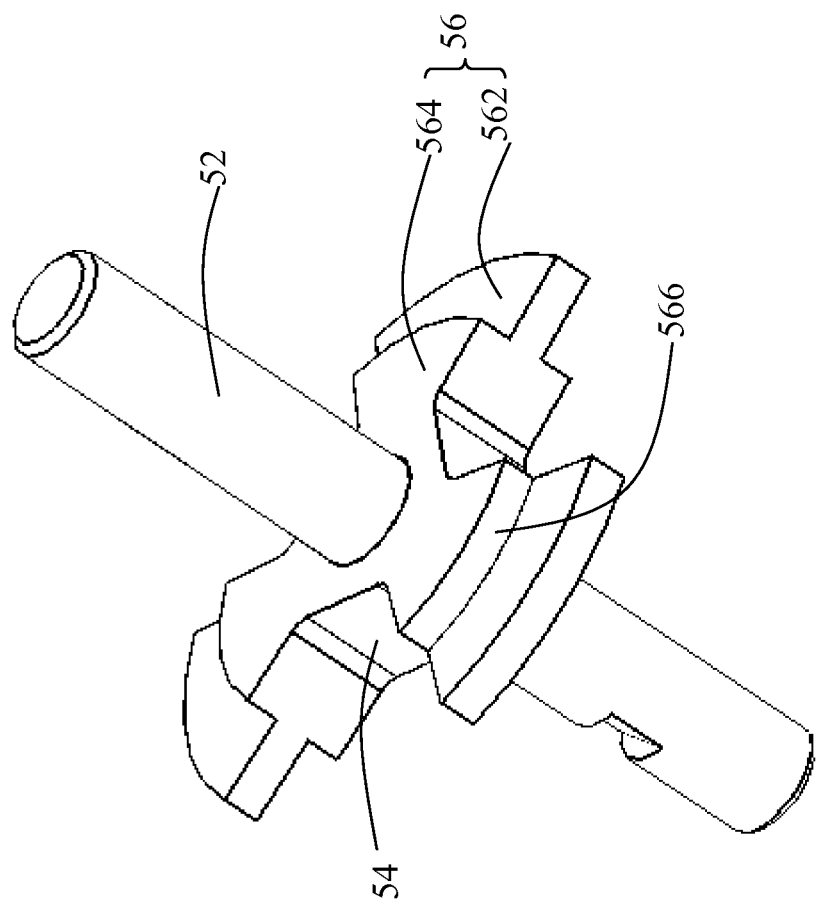
FIGS. 4A-B illustrate a rotor used in an electromagnetic drive mechanism in accordance with some embodiments.

FIG. 4A illustrates a rotor 50 in accordance with some embodiments. Rotor 50 comprises an output shaft 52 and a rotor core 54 that is fixed to output shaft 52. In some embodiments, output shaft 52 may be made of a non-magnetic material, while rotor core 54 will comprise a paramagnetic material such as steel. Rotor core 54 may comprise a plurality of rotor poles 56 extending outwards in radial directions, with each pole 56 having a radial inner portion 564 and a radial outer portion 562. Inner portion 564 may be configured to have a greater thickness or axial height than outer portion 562, such that a step 566 is formed between an inner portion 564 and its respective outer portion 562. In some embodiments, two steps 566 are formed between inner portion 564 and outer portion 562 for each stator pole 56, one adjacent to each axial side of rotor pole 56.

In the embodiment illustrated in FIG. 4A, rotor 50 comprises three rotor poles 56 spaced in circumferentially equal intervals around a central axis. It is understood that different numbers of rotor poles may be used in other embodiments, such as four, five, or six rotor poles. In some embodiments, the number of rotor poles 56 is configured to be the same as the number of stator poles 36.

Figure 4B:
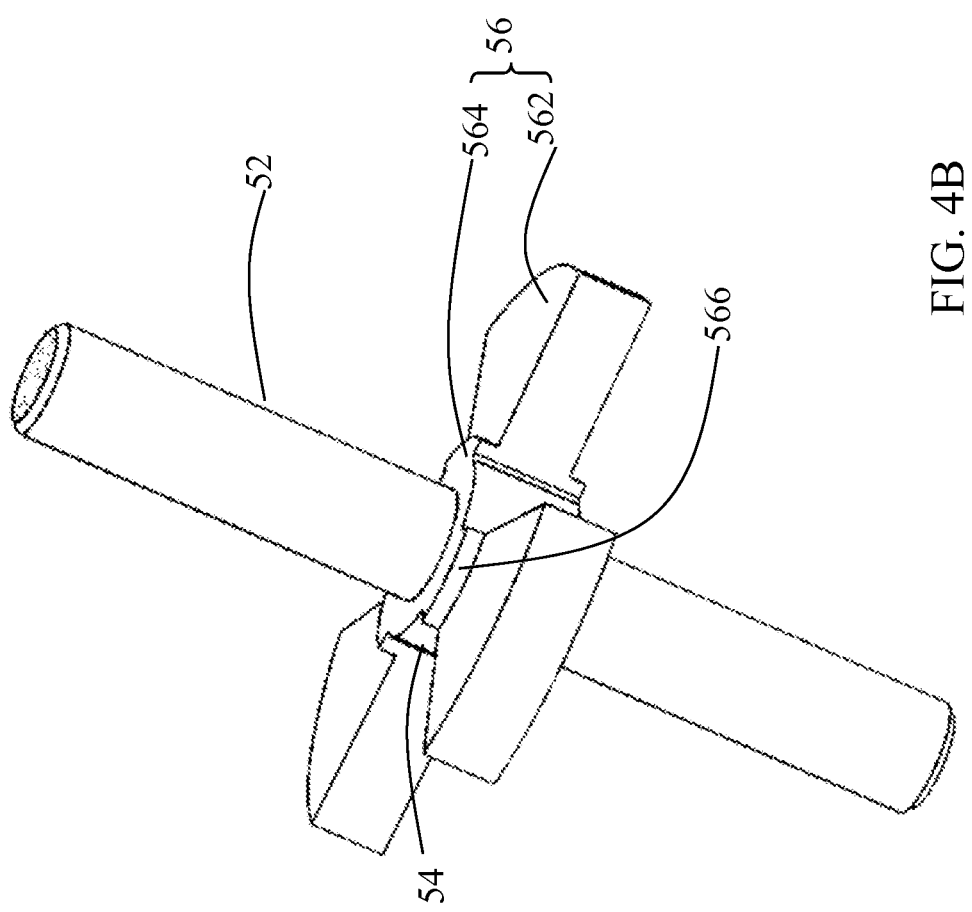

As illustrated in FIG. 4A, the radial width of radial inner and outer portions 562 and 564 of rotor poles 56 may be configured to be substantially equal. However, different proportions of the widths of radial inner and outer portions 562 and 564 may be used. For example, FIG. 4B illustrates an embodiments wherein the width of a radial outer portion 562 of a rotor pole 56 is much larger than that of its corresponding radial inner portion 564. Different proportions may be configured in consideration of various factors, such as ease of manufacture or amount of material used. It is understood that for different embodiments of rotor 50, stator 30 may also be configured accordingly to accommodate. For example, a stator 30 configured to correspond with the rotor 50 illustrated in FIG. 4B may have radial inner portions 362 with smaller radial widths than that of radial outer portions 364, corresponding to the radial widths of inner and outer portions 564 and 562 of rotor 50.

As illustrated in FIG. 2, stator 30 may comprise upper and lower stator cores 32 positioned above and below rotor core 54, with each stator core 32 having a number of stator poles 36 equal to the number of rotor poles 56 on rotor 50. The circumferential widths of the stator poles 36 and rotor poles 56 are configured to be substantially equal to each other, and centers of stator poles 36 are configured to be substantially co-axial with the axis of rotor 50.

In the illustrated embodiment, rotor core 54 is positioned between the upper and lower stator cores 32. The thickness of the radial outer portions 562 is configured to be smaller than the distance between radial outer portions 364 of upper and lower stator cores 32. Similarly, the thickness of radial inner portions 564 is configured to be smaller than the distance between radial inner portions 362 of upper and lower stator cores 32, such that an air gap is formed between stator poles 36 and rotor poles 56. In addition, an air gap is formed between steps 366 in upper and lower stator cores 32 and steps 566 in rotor core 54, so that rotor 50 is able to rotate within stator 30.

Figure 5:
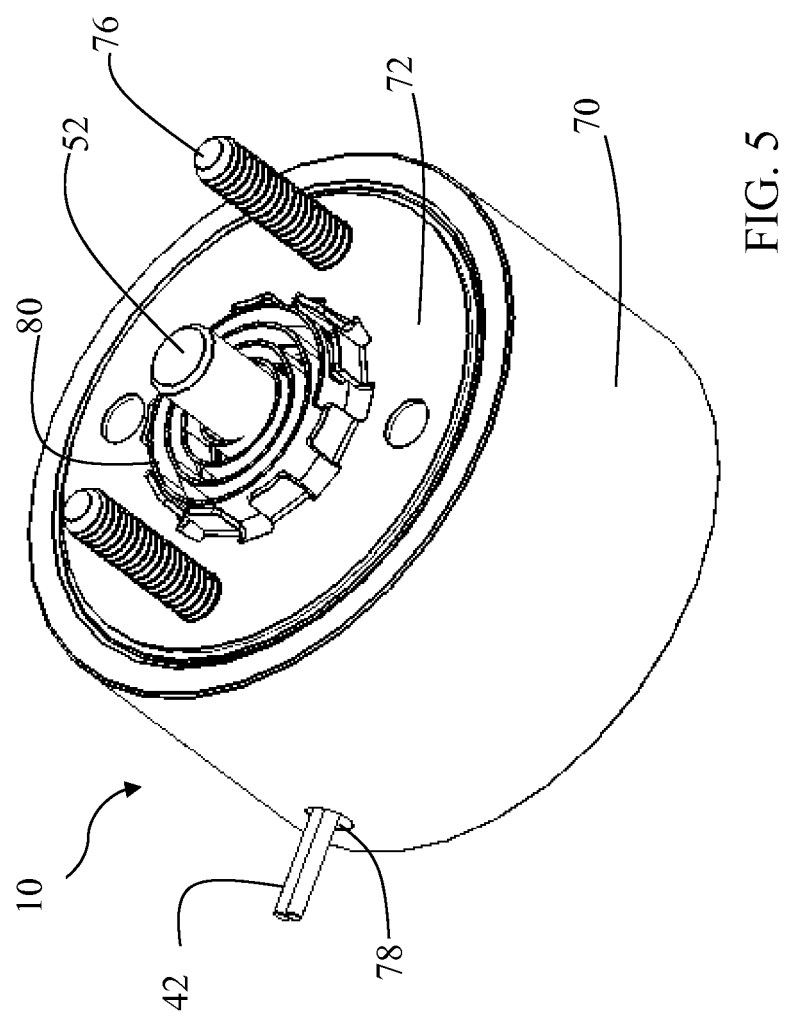
FIG. 5 illustrates an assembled electromagnetic drive mechanism in accordance with some embodiments.

In some embodiments, drive mechanism 10 further comprises a housing 70 and an end cap 72 on one end of housing 70, as illustrated in FIG. 5. Housing 70 may be substantially cylindrical. Housing 70 and end cap 72 may be made of a magnetic permeable material. Stator 30 and rotor core 54 may be accommodated within housing 70, while one end of output shaft 52 may extend through end cap 72 to outside housing 70, so that power from the drive mechanism 10 may be transferred through the output shaft 52 to an external application, e.g., the bypass door of a rotary valve.

In some embodiments, end cap 72 contains one or more through holes, through which a fastener 76, such as a threaded mounting screw, may pass, thereby allowing driving mechanism 10 to be secured to an external structure, such as a mount or frame associated with the external application. Housing 70 may also contain a through hole 78 to allow ends 42 of winding groups 40 to extend outside housing 70 to be coupled to an external power source, such as a battery, a generator, a rectifier, etc.

Driving mechanism 10 may further comprise a torsion spring 80 or other type of spring component. In some embodiments, torsion spring 80 may be configured with one end fixed to the rotor 50, and another end fixed to stator 30 or another stationary part of driving mechanism 10, such that during an interruption or breakage in power, the torsion spring 80 resets the position of rotor 50 to a pre-configured initial position. In some embodiments, torsion spring 80 may comprise a spiral coil, with an inner end attached to output shaft 52, and an outer end attached to end cap 72.

Figure 6:
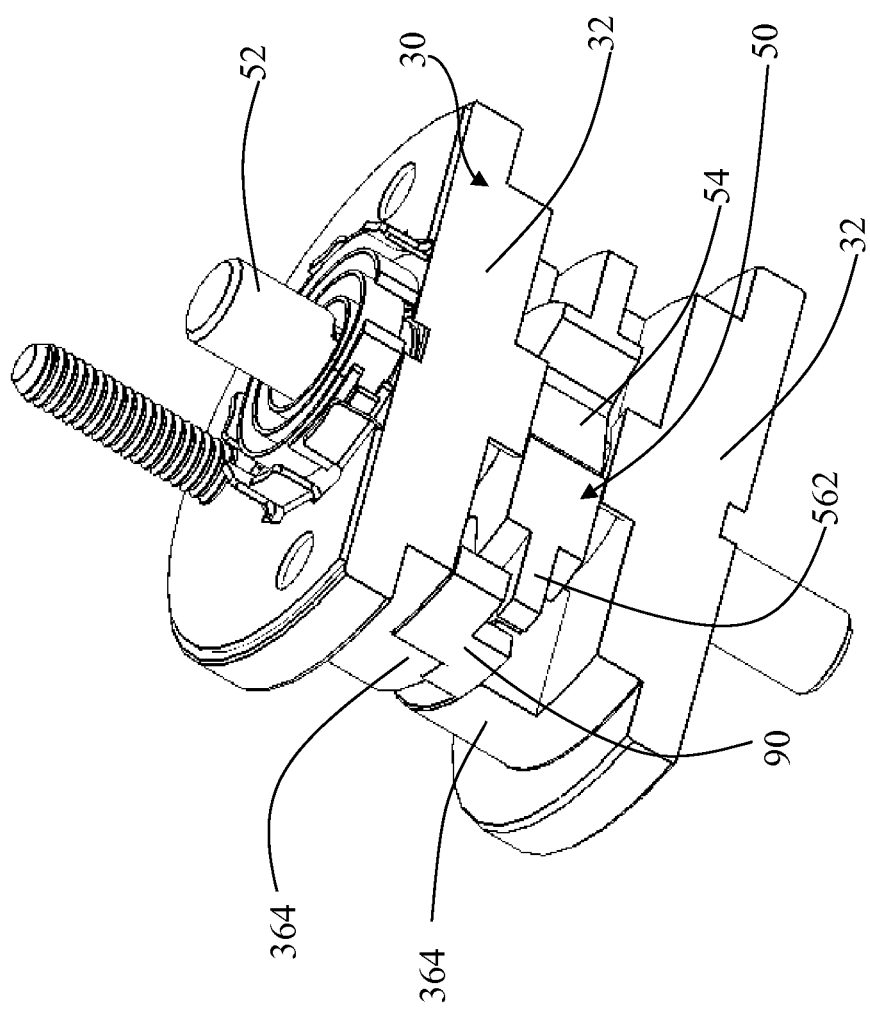
FIG. 6 illustrates a perspective cross-sectional view of an electromagnetic drive mechanism in accordance with some embodiments.
Figure 7:
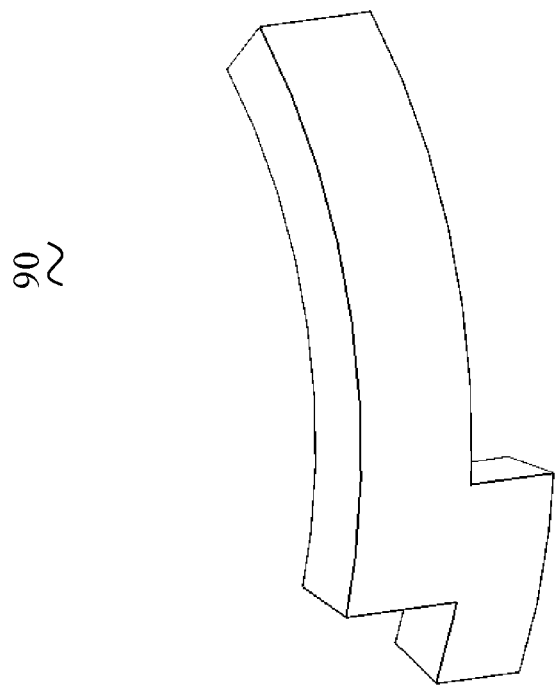
FIG. 7 illustrates a motion limiting structure that may be used in an electromagnetic drive mechanism in accordance with some embodiments.

FIG. 6 illustrates a cross-sectional view of driving mechanism 10 in accordance with some embodiments, in which stator 30 further comprises a motion limiting structure 90 located between the upper and power stator cores 32. Motion limiting structure 90, as illustrated in FIG. 7, may be configured to be substantially shaped to have a curve or arc. In addition, motion limiting structure 90 may be configured to be securely fitted in the gap between a pair of circumferentially overlapping outer radial portions 364 of stator poles 36 of upper and lower stator cores 32, to limit to movement of rotor 50. Motion limiting structure 90 may also configured to fit within a gap between two adjacent and circumferentially offset outer radial portions 364 on either upper or lower stator poles 36. In some embodiments, motion limiting structure 90 may also help align corresponding stator poles 36 of upper and lower stator cores 32 with each other.

In an initial unpowered state of driving mechanism 10 (no power running through winding groups 40), rotor poles 56 of rotor 50 are initially positioned between adjacent stator poles 36, being slightly biased towards a particular pole 36. When winding groups 40 are powered, a magnetic field is generated and magnetizes stator core 32 and stator poles 36. Magnetized stator poles 36 exerts an attractive force on adjacent rotor poles 56, rotating rotor 50 until a rotor pole 56 comes into contact with motion limiting structure 90. When power to winding groups 40 is off, the magnetic field disappears, and rotor 50 rotates back to the initial position under the urge of torsion spring 80.

In the illustrated embodiments, opposite steps 566 and 366 of rotor poles 56 and stator poles 36, respectively, function to increase the amount of surface area overlap (by providing additional overlapping radial faces in addition to axial faces perpendicular to shaft 52 of rotor 50) between rotor poles 56 and stator poles 36 for generating reluctance torque, thus improving the overall torque and response speed of electromagnetic drive mechanism 10. In addition, because rotor poles 56 are configured to have radial outer portions 562 axially thinner than radial inner portions 564, and thicker inner portions 564 axially overlap with at least a portion of thicker radial outer portions 364 of stator poles 36, the axial dimension of drive mechanism 10 may be reduced. The increase of reluctance torque also allows for a smaller, lighter rotor 50 be used. The reduction of the size of rotor 50 decreases the rotor inertia, allow for faster dynamic response.

In the foregoing specification, various aspects have been described with reference to specific embodiments thereof. It will, however, be evident that various modifications and changes may be made thereto without departing from the broader spirit and scope of various embodiments described herein. For example, the above-described systems or modules are described with reference to particular arrangements of components. Nonetheless, the ordering of or spatial relations among many of the described components may be changed without affecting the scope or operation or effectiveness of various embodiments described herein. In addition, although particular features have been shown and described, it will be understood that they are not intended to limit the scope of the claims or the scope of other embodiments, and it will be clear to those skilled in the art that various changes and modifications may be made without departing from the scope of various embodiments described herein. The specification and drawings are, accordingly, to be regarded in an illustrative or explanatory rather than restrictive sense. The described embodiments are thus intended to cover alternatives, modifications, and equivalents.

The invention claimed is:

1. An electromagnetic drive mechanism, comprising:
   a rotor comprising an output shaft, and a rotor core attached to the output shaft and having a plurality of rotor poles, wherein a rotor pole of the plurality of rotor poles comprises a radial inner portion having a first thickness in an axial direction of the output shaft and a radial outer portion having a second thickness in an axial direction of the output shaft different from the first thickness; and
   a stator comprising:
      a stator core having a base and a plurality of stator poles extending axially from the stator base, wherein a stator pole of the plurality of stator poles comprises a radial inner portion having a first thickness in an axial direction of the output shaft and a radial outer portion having a second thickness in an axial direction of the output shaft different from the first thickness; and
      a winding wound around the plurality of stator poles of the stator core a torsion spring configured to return the rotor to a pre-determined position in response to the winding being unpowered, wherein the pre-determined position of the rotor is such that a rotor pole of the plurality of rotor poles is located between two adjacent stator poles of the plurality of stator poles of the stator core and closer to one of the two adjacent stator poles than another one of the two adjacent rotor poles.

2. The electromagnetic drive mechanism of claim 1, wherein a circumferential width of the stator pole is equal to a circumferential width of the rotor pole.

3. The electromagnetic drive mechanism of claim 1, wherein the first thickness of the radial inner portion of the rotor pole is greater than the second thickness of the radial outer portion of the rotor pole.

4. The electromagnetic drive mechanism of claim 3, wherein the radial inner portion and radial outer portion of the rotor pole form a first step adjacent to a first axial side of the rotor pole and a second step adjacent to a second axial side of the rotor pole opposite to the first axial side.

5. The electromagnetic drive mechanism of claim 1, wherein the first thickness of the radial inner portion of the stator pole is less than the second thickness of the radial outer portion of the stator pole.

6. The electromagnetic drive mechanism of claim 1, wherein the stator core comprises three stator poles, and the rotor core comprises three rotor poles.

7. The electromagnetic drive mechanism of claim 1, wherein the stator further comprises a second stator core.

8. The electromagnetic drive mechanism of claim 7, wherein the rotor core is positioned between the stator core and second stator core.

9. The electromagnetic drive mechanism of claim 7, further comprising a motion limiting structure configured to limit a range of rotation of the rotor.

10. The electromagnetic drive mechanism of claim 9, wherein at least a portion of the motion limiting structure is positioned between a first stator pole of the plurality of stator poles of the stator core and a second stator pole of the plurality of stator poles of the second stator core circumferentially overlapping with the first stator pole.

11. The electromagnetic drive mechanism of claim 9, wherein the motion limiting structure is configured to prevent the rotor from rotating past a pre-determined point when the winding is powered.

12. The electromagnetic drive mechanism of claim 1, wherein the torsion spring has a first end fixed to the output shaft of the rotor and a second end fixed to a component stationary relative to the stator.

13. The electromagnetic drive mechanism of claim 1, the stator further comprising a sleeve fit over the stator core, wherein the winding is wound around an outside of the sleeve.

14. The electromagnetic drive mechanism of claim 13, wherein the sleeve comprises an insulating material.

15. The electromagnetic drive mechanism of claim 1, wherein the radial inner portion of the rotor pole has a radial width substantially equal to a radial width of the radial outer portion of the rotor pole.

16. The electromagnetic drive mechanism of claim 1, wherein the radial inner portion of the rotor pole has a radial width less than a radial width of the radial outer portion of the rotor pole.

17. The electromagnetic drive mechanism of claim 1, wherein the rotor core comprises a paramagnetic material and the output shaft comprises a non-magnetic material.

18. The electromagnetic drive mechanism of claim 1, wherein:
the radial inner portion and the radial outer portion of the rotor pole form a first step there between; and
the radial inner portion and the radial outer portion of the stator pole form a step there between and facing the first step.

* * * * *